United States Patent
Bostick et al.

(10) Patent No.: US 10,044,464 B1
(45) Date of Patent: Aug. 7, 2018

(54) BLOCKING THE CAPTURE OF PHOTO AND VIDEO CONTENT

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Brian M. O'Connell, Wake, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/856,159

(22) Filed: Dec. 28, 2017

Related U.S. Application Data (63) Continuation of application No. 15/637,430, filed on Jun. 29, 2017.

(51) Int. Cl.
| | |
|---|---|
| *G06F 21/62* | (2013.01) |
| *H04K 3/00* | (2006.01) |
| *F21V 33/00* | (2006.01) |
| *F21V 14/00* | (2018.01) |
| *G06F 21/55* | (2013.01) |
| *A63J 5/02* | (2006.01) |
| *G06F 21/60* | (2013.01) |

(52) U.S. Cl.
CPC ............... *H04K 3/40* (2013.01); *A63J 5/021* (2013.01); *F21V 14/006* (2013.01); *F21V 33/0008* (2013.01); *F21V 33/0076* (2013.01); *G06F 21/554* (2013.01); *G06F 21/60* (2013.01); *G06F 21/62* (2013.01)

(58) Field of Classification Search
None
See application file for complete search history.

(56) References Cited

U.S. PATENT DOCUMENTS

| | | | |
|---|---|---|---|
| 6,731,416 B2 * | 5/2004 | Hazzard | G02B 5/32 |
| | | | 345/32 |
| 9,909,336 B1 * | 3/2018 | Smith | A45B 23/00 |

(Continued)

FOREIGN PATENT DOCUMENTS

| | | |
|---|---|---|
| WO | 2009068524 A1 | 6/2009 |
| WO | 2014115095 A2 | 7/2014 |

OTHER PUBLICATIONS

Bostick et al., "Blocking the Capture of Photo and Video Content", U.S. Appl. No. 15/637,430, filed Jun. 29, 2017, 31pages.

(Continued)

*Primary Examiner* — Malcolm Cribbs
(74) *Attorney, Agent, or Firm* — Edward J. Wixted, III (57) ABSTRACT

In an approach for blocking a user from the capture of a photograph without consent, a processor receives an indication that a user has entered a location. A processor projects a hologram that blocks the user from photo capture. A processor detects images within the defined location, wherein the images include a person. A processor evaluates an authorization to capture a photo by the person. A processor evaluates a current contextual condition of the user to allow for photo capture. A processor alter the hologram, based on the evaluated authorization to capture the photo by the person and the evaluated current contextual condition of the user to allow for photo capture.

1 Claim, 4 Drawing Sheets

(56) References Cited

U.S. PATENT DOCUMENTS

| | | | |
|---|---|---|---|
| 2003/0223102 A1* | 12/2003 | Thor | G03H 1/0841 |
| | | | 359/15 |
| 2004/0145540 A1* | 7/2004 | Amanai | G02B 5/0252 |
| | | | 345/8 |
| 2009/0073087 A1* | 3/2009 | Janson | G02B 27/2214 |
| | | | 345/55 |
| 2010/0149782 A1 | 6/2010 | Smith, Jr. et al. | |
| 2012/0056546 A1* | 3/2012 | Harvey | H05B 37/0227 |
| | | | 315/159 |
| 2014/0217074 A1* | 8/2014 | Thor | B23K 26/006 |
| | | | 219/121.69 |
| 2015/0049487 A1 | 2/2015 | Connor | |
| 2016/0358013 A1 | 12/2016 | Carter et al. | |
| 2017/0318438 A1* | 11/2017 | Chien | H04W 68/005 |

OTHER PUBLICATIONS

IBM, List of Patent Applications Treated As Related, Appendix P, Dated Dec. 28, 2017, 2 pages.

\* cited by examiner

BLOCKING THE CAPTURE OF PHOTO AND VIDEO CONTENT

BACKGROUND

The present invention relates generally to the field of visual imagery, and more particularly to blocking a user from the capture of a photograph without consent.

Photography is the process and practice of creating photographs. A photograph is an image created by light falling on a light-sensitive surface, usually photographic film or an electronic medium. Most photographs are created using a camera, which uses a lens to focus the scene's visible wavelengths of light into a reproduction of what the human eye would see. Presently, many mobile devices have built-in cameras that are capable of taking photographs as good as a stand-alone camera.

Holography is the science and practice of making holograms. A hologram is a photographic recording of a light field, rather than of an image formed by a lens, and a hologram is used to display a fully three-dimensional image of the holographed subject, which is seen without the aid of special glasses or other intermediate optics. The hologram itself is not an image and it is usually unintelligible when viewed under diffuse ambient light. The hologram is an encoding of the light field as an interference pattern of seemingly random variations in the opacity, density, or surface profile of the photographic medium. When suitably lit, the interference pattern diffracts the light into a reproduction of the original light field and the objects that were in it appear to still be there, exhibiting visual depth cues, such as parallax and perspective, that change realistically with any change in the relative position of the observer.

SUMMARY

Aspects of an embodiment of the present invention disclose a method, computer program product, and computing system for accessing data and applications on a device. A processor receives an indication that a user has entered a location. A processor projects a hologram that blocks the user from photo capture. A processor detects images within the defined location, wherein the images include a person. A processor evaluates an authorization to capture a photo by the person. A processor evaluates a current contextual condition of the user to allow for photo capture. A processor alter the hologram, based on the evaluated authorization to capture the photo by the person and the evaluated current contextual condition of the user to allow for photo capture.

DETAILED DESCRIPTION

Embodiments of the present invention recognize that there are various scenarios that some people do not want to be photographed (or defined people within their proximity, e.g., children, spouse) or only want to be photographed by an authorized photographer/device. For example, when a celebrity enters a space visible to paparazzi, the celebrity often tries to conceal their identity by wearing obscure clothing, hats, and sunglasses that make it difficult to get a clear photograph. With embodiments of the present invention, the celebrity could be wearing a hat with micro cameras and pico projectors that project holograms on each side of the celebrity, such that paparazzi cannot get a clear photo unless they have consent for the specific context.

Embodiments of the present invention disclose a method of detecting unauthorized people in an environment and projecting one or more holograms around the person from a wearable device with a pico projector, such as augmented reality (AR) glasses, smart glasses, or a hat with pico projectors that has the effect of blocking the subject user or special people that the special user has previously defined from taking a photograph without the consent of the user. In cases of consent and verification that others not authorized do not have a viewing angle, embodiments of the present invention remove one or more holograms from the viewing angle of the consenting photographer to allow for photo capture of the subject user, based on contextual analysis of location, activity, emotional state, people accompanying the subject user (e.g., children), date, and time. In the case of remuneration, embodiments of the present invention go through an additional check to verify the user has agreed to pay/receive a specific amount for photo and transfer of funds takes place automatically if the photo is captured.

Embodiments of the present invention will now be described in detail with reference to the Figures.

Figure 1:
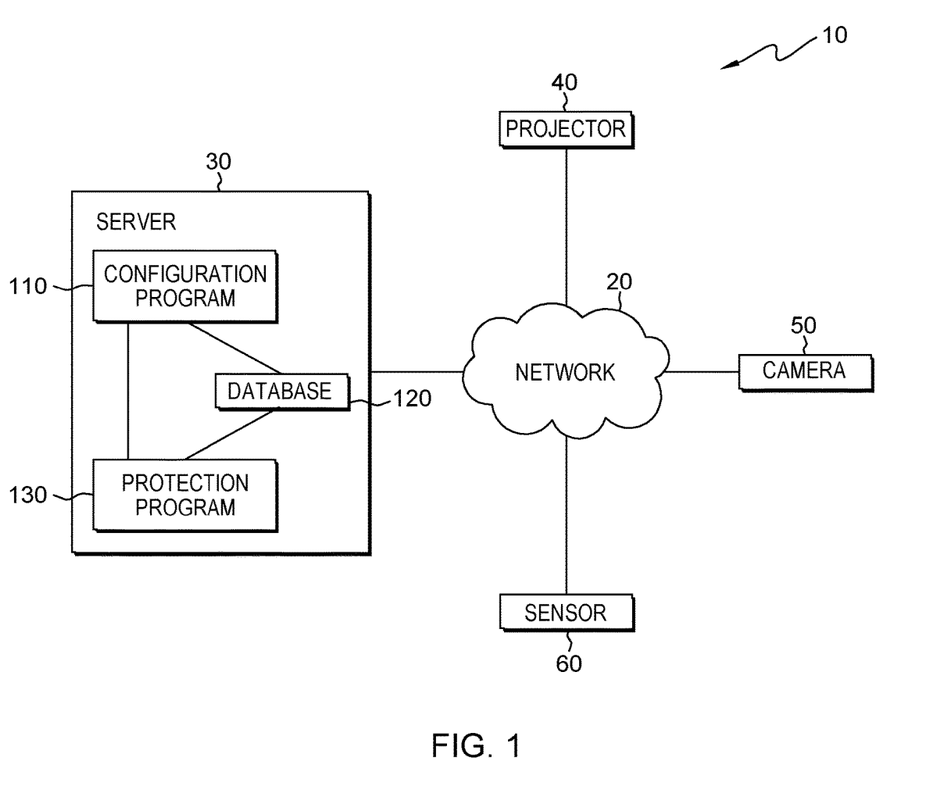
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes server 30, projector 40, camera 50, and sensor 60 interconnected over network 20. Network 20 may be a local area network (LAN), a wide area network (WAN) such as the Internet, a cellular data network, any combination thereof, or any combination of connections and protocols that will support communications between server 30, projector 40, camera 50, and sensor 60, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with projector 40, camera 50, and sensor 60 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. In the depicted embodiment, server 30 contains configuration program 110, database 120, and projection program 130. In other embodiments, server 30 may include configuration program 110, database 120, projection program 130, and/or other components, as depicted and described in further detail with respect to FIG. 4.

Projector 40 may be any projector that is able to project a hologram around the user and other protected people (or a particular side of the user and other protected people), which may be done using one or more projectors 40. In one embodiment, projector 40 may be a handheld projector, pocket projector, mobile projector, pico projector, mini beamer, or anything that can project digital images onto any nearby surface or project digital images into the air. In some embodiments, projectors, such as projector 40, may be operably affixed to one or more devices, such as, for example, a smartwatch, badge, door, camera, wearable device, mobile device, hat, glasses, etc. In other embodiments, projector 40 may include multiple components, as depicted and described in further detail with respect to FIG. 4.

Camera 50 may be any optical instrument for recording or capturing images, which may be stored locally, transmitted to another location, or both. In one embodiment, camera 50 may be a handheld camera, body mounted camera, wearable camera, or anything that can capture an image. In some embodiments, cameras, such as camera 50, may be operably affixed to one or more devices, such as, for example, a smartwatch, badge, door, camera, wearable device, mobile device, etc. In other embodiments, camera 50 may include multiple components, as depicted and described in further detail with respect to FIG. 4.

Sensor 60 may be any device capable of detecting events or changes in an environment and providing a corresponding output. In one embodiment, sensor 60 may provide a corresponding output of a change in a user's heart rate to projection program 130. Examples of sensor 60 may be, but is not limited to: a heart rate sensor; weight sensor; optical sensor; facial recognition sensor; near field communication (NFC) device; radio-frequency identification (RFID) tag; global positioning system (GPS); and/or Bluetooth® device. In some embodiments, sensors, such as sensor 60, may be operably affixed to one or more devices, such as, for example, a smartwatch, badge, door, camera, wearable device, mobile device, etc. In other embodiments, sensor 60 may include multiple components, as depicted and described in further detail with respect to FIG. 4.

Configuration program 110 determines a protected person and a proximity range for projection. In doing so, configuration program 110 receives information about protected people. Configuration program 110 receives proximity range for projection for protected people. Configuration program 110 receives information about authorized people and devices to take photos for specific context. In the depicted embodiment, configuration program 110 resides on server 30. In other embodiments, configuration program 110 may reside on another server or another computing device, provided that configuration program 110 can access database 120, projection program 130, projector 40, camera 50, and sensor 60.

Database 120 may be a repository that may be written to and/or read by configuration program 110 and projection program 130. In some embodiments, configuration program 110 may receive information about who should be considered a protected person and store the information about who should be considered a protected person to database 120. In other embodiments, database 120 may store devices and people who may be authorized to take a photo of the user for a specific context. In the depicted embodiment, database 120 resides on server 30. In other embodiments, database 120 may reside on another server or another computing device, provided that database 120 is accessible to configuration program 110 and projection program 130.

Projection program 130 blocks a user from the capture of a photograph without consent. In doing so, projection program 130 receives indication that protected people entered a defined location. Projection program 130 detects people in the surrounding area. Projection program 130 evaluates authorization to capture photo. Projection program 130 determines current context of protected people. Projection program 130 evaluates conditions to allow for photo capture. Projection program 130 determines whether conditions allow for photo capture. If the conditions allow for photo capture, projection program 130 allows photo capture. If the conditions do not allow for photo capture, projection program 130 does not allow photo capture. In the depicted embodiment, projection program 130 resides on server 30. In other embodiments, projection program 130 may reside on another server or another computing device, provided that projection program 130 can access configuration program 110, database 120, projector 40, camera 50, and sensor 60.

Figure 2:
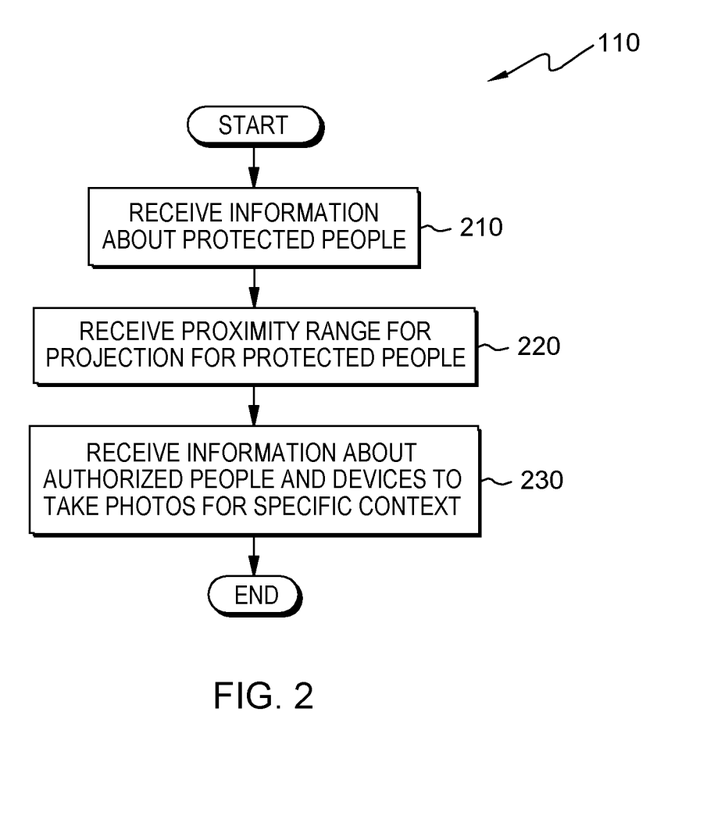
FIG. 2 depicts a flowchart of the steps of a configuration program, executing within the computing system of FIG. 1, for determining a protected person and a proximity range for projection, in accordance with an embodiment of the present invention.

FIG. 2 depicts a flowchart of the steps of a configuration program, executing within the computing system of FIG. 1, in accordance with an embodiment of the present invention. Configuration program 110 determines a protected person and a proximity range for projection.

Herein, an embodiment of the present invention focuses on a photograph. Other embodiments may include video or any other method of capturing the visible/auditory imagery of a person.

In step 210, configuration program 110 receives information about protected people. A protected person is anyone, in addition to the user, that the user wishes to be protected from photographs without consent (e.g., children, spouse, and other family members). The information about the protected people can include, but not limited to: likes and dislikes; age; gender; familial status (e.g., son, daughter, mother, husband, etc.); habits; behaviors; height; weight; and characteristics. In one embodiment, configuration program 110 receives information about the protected people from a user. In other embodiments, configuration program 110 retrieves previously-stored information about the protected people from database 120. In some embodiments, configuration program 110 receives information about the protected people by learning the characteristics, qualities, and habits of a particular individual or of a general type of individual (e.g., child, woman, man, or celebrity). Configuration program 110 may store the received information to database 120 for future use.

In step 220, configuration program 110 receives proximity range for projection for protected people. A proximity range for projection is the range that projection program 130 uses projector 40 to project a hologram around the user and other protected people accompanying the user. In one embodiment, configuration program 110 receives proximity ranges for projection for protected people from a user. In other embodiments, configuration program 110 retrieves previously-stored proximity ranges for projection for protected people from database 120. In some embodiments, configuration program 110 receives proximity ranges for projection for protected people by learning the characteristics, qualities, and habits of a particular individual or of a general type of individual (e.g., child, woman, man, or celebrity). Configuration program 110 may store the received proximity ranges to database 120 for future use.

In step 230, configuration program 110 receives information about authorized people and devices to take photos for specific context. An authorized person is anyone that the user authorizes to capture a photograph of the user and/or another protected person. An authorized device is any type of device that the user authorizes to be used to capture a photograph of the user and/or another protected person. The information about the authorized people can include, but not limited to: names, employers, whether they are freelancing or not, other affiliations, years of experience, and device(s) owned by the person. The information about the authorized devices can include, but not limited to: type of device, capabilities of device, owner of device, and age of device. In one embodiment, configuration program 110 receives information about authorized people and devices to take photos for specific context from a user. In other embodiments, configuration program 110 retrieves previously-stored information about authorized people and devices to take photos for specific context from database 120. In some embodiments, configuration program 110 receives information about authorized people and devices to take photos for specific context by learning the characteristics, qualities, and habits of a particular individual or of a general type of individual (e.g., child, woman, man, or celebrity). In other embodiments, configuration program 110 receives information about authorized people and devices to take photos for specific context directly from camera 50. Configuration program 110 may store the received information to database 120 for future use.

Configuration program 110 can also define the protected people, proximity range, and authorized people and devices after the fact from projector 40, camera 50, sensor 60, and/or projection program 130.

Figure 3:
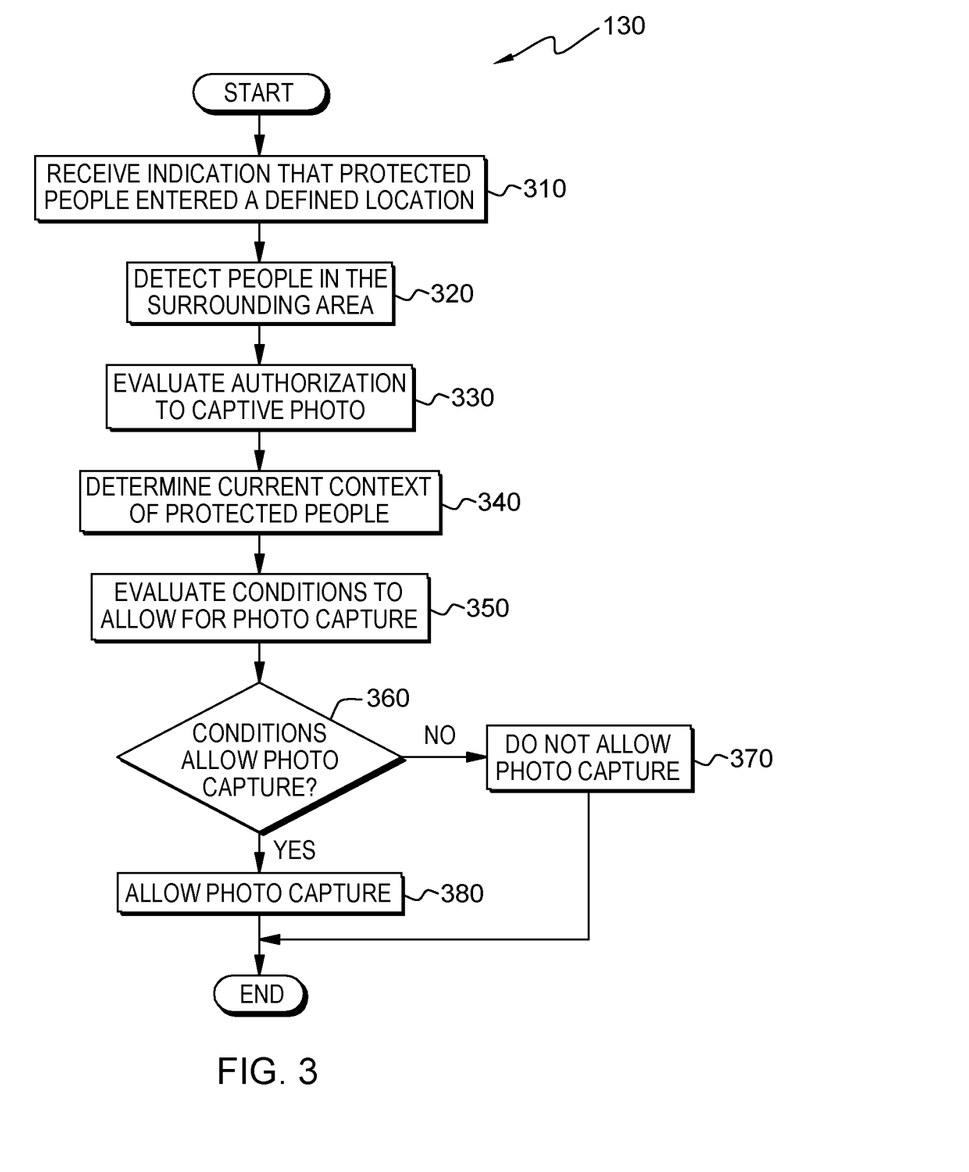
FIG. 3 depicts a flowchart of the steps of a projection program, executing within the computing system of FIG. 1, for blocking a user from the capture of a photograph without consent, in accordance with an embodiment of the present invention.

FIG. 3 depicts a flowchart of the steps of a projection program, executing within the computing system of FIG. 1, in accordance with an embodiment of the present invention. Projection program 130 blocks a user from the capture of a photograph without consent.

In step 310, projection program 130 receives indication that protected people entered a defined location. In one embodiment, sensor 60 is a GPS and sends information to projection program 130 to alert projection program 130 of the precise location of the protected people. In other embodiments, camera 50 may read various street signs, landmarks, addresses, or buildings to alert projection program 130 of the approximate location of the protected people.

A defined location is a location that is determined by a user or projection program 130. In one embodiment, the location is either retrieved from a list of locations entered by a user, or a list of locations that the user will most likely visit. The locations are retrieved from a list of previously stored locations within database 120. The locations that the user will most likely visit are determined by the time of year, the people accompanying the user, the time of day, the geographical area, whether for work or pleasure, and/or any number of determining factors that the user uses to determine a defined location. In other embodiments, projection program 130 uses the learned behaviors and characteristics of the user and automatically defines locations as time goes on.

In one embodiment, projection program 130 receives an indication that the protected people entered a defined location, possibly visible to others, from a wearable device that contains projector 40, camera 50, sensor 60, or any other device that could send information to alert projection program 130 that the protected people entered a defined location. In other embodiments, projection program 130 receives an indication that the protected people entered a defined location directly from the user's actions, where these actions could be, for example: pressing a button on a smartwatch, pressing a button on a mobile device, activating a sensor, projecting a hologram from a wearable device.

In one embodiment, when the user enters the defined location, projection program 130 determines if the user is alone or with other protected people within the defined proximity range, using information retrieved from database 120 or configuration program 110. In other embodiments, projection program 130 uses projector 40, camera 50, and/or sensor 60 to determine if the user is alone or with other protected people. In some embodiments, projection program 130 uses projector 40 to, automatically, project a hologram around the user and the other protected people with the user as soon as they enter the defined location.

There may be one or more projectors 40 used to project one or more holograms. For example, there may be four projectors 40 embedded in a hat—one in the front, one in the back, one on the left side, and one the right side. The projector 40 in the front of the hat is able to project a hologram in the front of the user. The projector 40 in the back of the hat is able to project a hologram in the back of the user. The projector 40 on the left side of the hat is able to project a hologram on the left side of the user. The projector 40 on the right side of the hat is able to project a hologram on the right side of the user.

In a similar example, a protected person is the daughter of the user. Here, if the daughter is standing to the right of the user, the projector 40 embedded on right side of the user's hat may project a hologram to cover the left side of the user's daughter. If the daughter is to the right, but slightly behind the user, then the projected hologram may cover the front-left side of the daughter. If the daughter is to the right, but slightly in front of the user, then the projected hologram may cover the back-left side of the daughter. Configuration program 110 receives information about the protected person, such as the protected person's height, and information about the range of projection of projector 40. Therefore, in this example, if configuration program 110 receives information that the user's daughter is 56 inches tall and the projector 40 has the capability to project a height of 60 inches up to one foot away from the user and the user's daughter is 10 inches away from the user, then projector 40 can cover the entire left side of the user's daughter.

In step 320, projection program 130 detects people in the surrounding area. In one embodiment, projection program 130 uses camera 50 and/or sensor 60 to detect other people in the surrounding area. For example, camera 50 can be a head-mounted camera, AR glasses, or smart glasses facing outward. In other embodiments, projection program 130 uses facial recognition to determine certain people and devices in the surrounding area. In some embodiments, projection program 130 retrieves information from configuration program 110 or database 120 to determine devices used for photo capture and to correlate the device to an owner.

In step 330, projection program 130 evaluates authorization to capture photo. In some embodiments, projection program 130 evaluates the authorization to capture a photo by retrieving information from database 120 that contains a list of people/devices that are authorized to capture a photo under certain circumstances. The retrieved information is compared to the people/devices determined to be in the surrounding area. If there is a match for a person/device, then projection program 130 determines that person/device in the surrounding area is authorized to capture a photo under certain circumstances. If there is no match for a person/device, then projection program 130 determines that no person/device in the surrounding area is authorized to capture a photo.

In step 340, projection program 130 determines current context of protected people. In one embodiment, projection program 130 determines the current location, activity, people accompanying the user, day, and/or time. In other embodiments, projection program 130 retrieves information from configuration program 110 or database 120 to determine the user's usual context when at the present location. In some embodiments, the user defines rules for each protected person and how they should be evaluated in current context to determine if they are available for photo capture and stores the rules to database 120. In such an embodiment, projection program 130 retrieves the rules from database 120 to determine the current context of the protected people.

In step 350, projection program 130 evaluates conditions to allow for photo capture. In some embodiments, projection program 130 evaluates the conditions to allow for a photo capture by retrieving information from database 120 that contains certain conditions that may allow for a photo capture of the user/protected people. The retrieved information is compared to the determined current contextual conditions of the protected people. If there is a match for contextual conditions, then projection program 130 determines that the current contextual conditions allow for photo capture. If there is no match for contextual conditions, then projection program 130 determines that the current contextual conditions do not allow for photo capture.

In decision 360, projection program 130 determines whether conditions allow for photo capture. Projection program 130 determines whether conditions allow for photo capture by analyzing the evaluated conditions to allow for photo capture. If projection program 130 determines that the conditions allow for photo capture, and the viewing angle from the photographer to the user/protected people does not include unauthorized people in the same viewing angle, then projection program 130 allows photo capture (step 380). In one embodiment, projection program 130 allows photo capture by altering the projection of the hologram to move location of the hologram or stop the projection of the hologram, such that the authorized photographer can capture a photo of the user/protected people. To alter the projection of the hologram, in one embodiment, one of the projectors 40 is turned off. To alter the projection of the hologram, in some embodiments, a motor turns the lens on projector 40 to point in a different direction. To alter the projection of the hologram, in other embodiments, a shutter covers part of the lens to remove the hologram from viewing angle needed to capture the photo.

In some embodiments, in the case of remuneration, projection program 130 determines if the user has agreed to pay a specific amount for the photograph, and, if so, the transfer of funds takes place automatically upon the photograph being captured. In other embodiments, in the case of a photographer requesting to capture a photo, projection program 130 determines the request is confirmed and the user has authorized the photographer to capture the photo, and, if the photo is determined to have been captured, projection program 130 can revoke the authorization for that photographer until another authorization is granted.

If projection program 130 determines that the conditions do not allow for photo capture, or the viewing angle from the photographer to the user/protected people includes unauthorized people in the same viewing angle, then projection program 130 does not allow photo capture (step 370). In some embodiments, projection program 130 does not allow photo capture by allowing the holograms to remain projected to block the user/protected people from photo capture until the user leaves the defined location.

Figure 4:
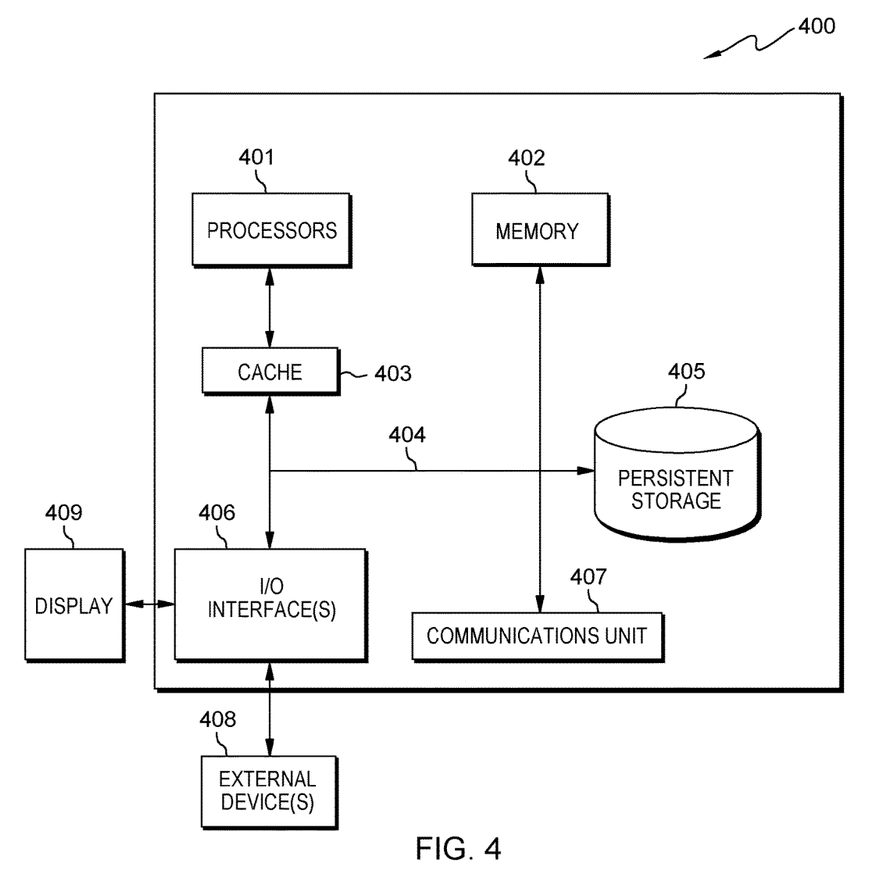
FIG. 4 depicts a block diagram of components of the computing devices/servers of FIG. 1, in accordance with an embodiment of the present invention.

FIG. 4 depicts computer system 400, which is an example of a system that includes components of server 30, projector 40, camera 50, and/or sensor 60. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407. Configuration program 110, database 120, and projection program 130 may be downloaded to persistent storage 405 of server 30 through communications unit 407 of server 30.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., configuration program 110, database 120, and projection program 130, can be stored on such portable computer readable storage media and can be loaded onto persistent storage 405 of server 30 via I/O interface(s) 406 of server 30. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for blocking a user from the capture of a photograph without consent, the method comprising:

receiving, by one or more processors, an indication that a user and protected people accompanying the user have entered a defined location, wherein the protected people are anyone the user specifies to block photo capture without consent;

projecting, by the one or more processors, a hologram that blocks the user from photo capture based on the indication;

detecting, by the one or more processors, images within the defined location, wherein the images include a person;

evaluating, by the one or more processors, an authorization to capture a photo by the person;

evaluating, by the one or more processors, a current contextual condition of the user to allow for photo capture;

determining, by the one or more processors, the person is authorized to capture the photo of the user;

determining, by the one or more processors, the current contextual condition of the user allows for photo capture;

determining, by the one or more processors, there are no unauthorized people within a path of the authorized person and the user;

altering, by the one or more processors, the hologram within the path of the authorized person and the user to allow photo capture based on the determination that (i) the person is authorized to capture the photo of the user, (ii) the current contextual condition of the user allows for photo capture, and (iii) there are no unauthorized people within the path of the authorized person and the user, wherein altering the hologram includes removing the hologram;

determining, by the one or more processors, the person requested to capture the photo;

determining, by the one or more processors, the request is confirmed and the user authorized the person to capture the photo;

determining, by the one or more processors, the photo has been captured; and revoking, by the one or more processors, authorization for the person to capture the photo;

determining, by the one or more processors, the person is not authorized to capture a photo of the user;

determining, by the one or more processors, the current contextual condition of the user does not allow for photo capture;

altering, by the one or more processors, the hologram to surround the user until the user leaves the defined location based on the determination that (i) the person is not authorized to capture the photo of the user, and (ii) the current contextual condition of the user does not allow for photo capture.

* * * * *